(12) United States Patent
Horimoto et al.

(10) Patent No.: US 10,103,364 B2
(45) Date of Patent: Oct. 16, 2018

(54) BASE MATERIAL INTEGRATED TYPE SEAL AND METAL MOLD FOR MANUFACTURING THE SAME

(71) Applicant: NOK CORPORATION, Tokyo (JP)

(72) Inventors: Takayuki Horimoto, Fujisawa (JP); Tetsuya Urakawa, Fujisawa (JP)

(73) Assignee: NOK Corporation (JP)

( * ) Notice: Subject to any disclaimer, the term of this patent is extended or adjusted under 35 U.S.C. 154(b) by 0 days.

(21) Appl. No.: 14/438,652

(22) PCT Filed: Oct. 7, 2013

(86) PCT No.: PCT/JP2013/077202
§ 371 (c)(1),
(2) Date: Apr. 27, 2015

(87) PCT Pub. No.: WO2014/069172
PCT Pub. Date: May 8, 2014

(65) Prior Publication Data
US 2015/0295210 A1  Oct. 15, 2015

(30) Foreign Application Priority Data
Nov. 1, 2012  (JP) .................................. 2012-241597

(51) Int. Cl.
*H01M 2/08* (2006.01)
*H01M 8/0273* (2016.01)
(Continued)

(52) U.S. Cl.
CPC ............... *H01M 2/08* (2013.01); *B29C 45/14* (2013.01); *B29C 45/14344* (2013.01);
(Continued)

(58) Field of Classification Search
CPC .............................. F16J 15/0818; F16J 15/122
See application file for complete search history.

(56) References Cited

U.S. PATENT DOCUMENTS 3,195,906 A * 7/1965 Moyers .................. F16J 15/127
174/85
3,355,181 A * 11/1967 Olson ..................... F16J 15/127
277/611
(Continued)

FOREIGN PATENT DOCUMENTS

CN        1666048 A       9/2005
CN     101032046 A       9/2007
(Continued)

OTHER PUBLICATIONS

Extended European Search Report for Application No. EP 13 85 0936 dated Oct. 16, 2015 (6 pages).

*Primary Examiner* — Kristina R Fulton
*Assistant Examiner* — L. Susmitha Koneru
(74) *Attorney, Agent, or Firm* — Harness, Dickey & Pierce, P.L.C.

(57) ABSTRACT

A seal with an integral base material in which a gasket is formed integrally with a film, sheet, or plate-shaped base material, wherein space saving is achieved by making the width of the gasket as small as possible. In order to achieve the foregoing, the following are provided: the film, sheet, or plate-shaped base material; the gasket that is provided integrally with the base material and that is formed of a rubbery elastic material; and a fill layer formed by the rubbery elastic material that is filled into a through hole that is provided in an open state in the base material. A portion of the fill layer is connected to the gasket and another portion extends out from the gasket at substantially the same thickness as the base material.

1 Claim, 7 Drawing Sheets

(51) Int. Cl.

| | | |
|---|---|---|
| *H01M 8/0267* | (2016.01) | |
| *F16J 15/12* | (2006.01) | |
| *H01M 8/0284* | (2016.01) | |
| *H01M 8/0286* | (2016.01) | |
| *B29C 45/14* | (2006.01) | |
| *B29C 45/16* | (2006.01) | |
| *B29C 45/26* | (2006.01) | |
| *H01M 8/0276* | (2016.01) | |
| *B29K 21/00* | (2006.01) | |
| *B29L 31/26* | (2006.01) | |

(52) U.S. Cl.
CPC .......... *B29C 45/1671* (2013.01); *B29C 45/26* (2013.01); *F16J 15/122* (2013.01); *H01M 8/0267* (2013.01); *H01M 8/0273* (2013.01); *H01M 8/0284* (2013.01); *H01M 8/0286* (2013.01); *B29C 2045/14967* (2013.01); *B29K 2021/00* (2013.01); *B29K 2715/00* (2013.01); *B29L 2031/265* (2013.01); *H01M 8/0276* (2013.01); *Y02P 70/56* (2015.11)

(56) References Cited

U.S. PATENT DOCUMENTS

| | | | | |
|---|---|---|---|---|
| 5,267,740 | A * | 12/1993 | Stritzke | F16J 15/0818 |
| | | | | 277/316 |
| 5,390,939 | A * | 2/1995 | Terauchi | E21D 11/385 |
| | | | | 277/648 |
| 5,492,343 | A * | 2/1996 | Smith | F16J 15/127 |
| | | | | 277/638 |
| 5,618,047 | A * | 4/1997 | Belter | B29C 45/26 |
| | | | | 277/632 |
| 5,626,348 | A * | 5/1997 | Takada | F16J 15/0825 |
| | | | | 277/593 |
| 6,231,053 | B1 * | 5/2001 | Wakamatsu | H01M 8/0271 |
| | | | | 277/628 |
| 6,460,859 | B1 * | 10/2002 | Hammi | F16J 15/122 |
| | | | | 277/596 |
| 6,543,787 | B1 * | 4/2003 | Inciong | F16J 15/127 |
| | | | | 277/593 |
| 6,553,664 | B1 * | 4/2003 | Schenk | F16J 15/067 |
| | | | | 29/460 |
| 6,626,439 | B1 * | 9/2003 | Forry | F16J 15/104 |
| | | | | 277/592 |
| 6,761,360 | B2 * | 7/2004 | Hammi | F16J 15/122 |
| | | | | 220/806 |
| 7,063,911 | B1 * | 6/2006 | Nagai | B29C 45/14344 |
| | | | | 429/435 |
| 7,278,639 | B2 * | 10/2007 | Forry | F16J 15/123 |
| | | | | 277/596 |
| 7,655,339 | B1 | 2/2010 | Kummerow et al. | |
| 7,681,890 | B2 * | 3/2010 | Griffin | F16J 15/061 |
| | | | | 277/592 |
| 8,313,681 | B2 * | 11/2012 | Watanabe | B29C 45/14336 |
| | | | | 264/251 |
| 8,833,771 | B2 * | 9/2014 | Lesnau, IV | F16J 15/061 |
| | | | | 277/591 |
| 2003/0104262 | A1 * | 6/2003 | Kuroki | H01M 8/0213 |
| | | | | 429/510 |
| 2005/0044689 | A1 * | 3/2005 | Yetter | B21D 53/84 |
| | | | | 29/469.5 |
| 2007/0298310 | A1 * | 12/2007 | Kato | H01M 4/861 |
| | | | | 429/509 |
| 2011/0104583 | A1 * | 5/2011 | Urakawa | B29C 45/14311 |
| | | | | 429/469 |

FOREIGN PATENT DOCUMENTS

| | | |
|---|---|---|
| EP | 1978552 A1 | 10/2008 |
| EP | 2202833 A2 | 6/2010 |
| JP | 2001-121584 A | 5/2001 |
| JP | 2004-245341 A | 9/2004 |
| JP | 2009-146910 A | 7/2009 |
| JP | 2011-096545 A | 5/2011 |

* cited by examiner

[CROSS SECTION OF PORTION A]

[CROSS SECTION OF PORTION B]

BASE MATERIAL INTEGRATED TYPE SEAL AND METAL MOLD FOR MANUFACTURING THE SAME

CROSS-REFERENCE TO RELATED APPLICATIONS

This application is a 371 U.S. National Stage Application of International Application No. PCT/JP2013/077202, filed on Oct. 7, 2013, and published in Japanese as WO 2014/069172 A1 on May 8, 2014. This application claims priority to Japanese Application No. 2012-241597, filed on Nov. 1, 2012. The entire disclosures of the above applications are incorporated herein by reference.

BACKGROUND OF THE INVENTION

Field of the Invention

The present invention relates to a base material integrated type seal in which a gasket is integrally formed in a film, a sheet or a plate-like base material, for example, a seal for a fuel battery which is provided for sealing a flow path formed in each of fuel battery cells of a fuel battery stack, and further relates to a metal mold which is used for manufacturing the same.

Description of the Conventional Art

The fuel battery is used in a wide intended purpose from a fuel batter for a compact power supply having about several tens W to an automotive power supply of 100 kW class, by mainly forming a fuel battery cell obtained by pinching a power generating body which includes an MEA (membrane electrode assembly) provided with a pair of electrode layers in both surfaces of an electrolyte membrane by separators, and forming a stack structure by laminating the fuel battery cells. A fluorine-based solid polymer membrane is mainly used for the electrolyte membrane of the MEA, and a proton conductivity is demanded. On the other hand, the separator is formed a flow path for supplying fuel gas (hydrogen gas) and oxidant gas (air including oxygen) to the electrolyte membrane, and has an important role which transmits electrons generated in an anode side on the basis of an electrochemical reaction.

Further, in this kind of fuel battery, it is necessary to seal the fuel battery so as to prevent the fuel gas and the oxidization gas, water and surplus gas created by the reaction thereof, and cooling water for cooling the stack from leaking out to an external portion or being mixed with each other.

FIG. 6 shows a conventional base material integrated type seal which is applied as a seal for a fuel battery, together with a part of the fuel battery. The base material integrated type seal 100 is constructed by integrally forming gaskets 102 and 102 which are made of a rubber-like elastic material (a rubber material or a synthetic resin material having a rubber-like elasticity) on both surfaces in a thickness direction of a film, a sheet or a plate-like base material 101 which is constructed by an MEA or a synthetic resin film arranged so as to surround an outer periphery of the MEA. Each of the gaskets 102 is constructed by a flat base 102a which is bonded to a surface of the base material 101, and a seal lip 102b which is formed so as to protrude like a chevron from the base 102a. Further, the base material integrated type seal 100 is interposed between outer peripheral portions of the separators 200 and 200 in the fuel battery cell, and the seal lips 102b and 102b in the gaskets 102 and 102 are brought into close contact with bottom surfaces of seal grooves 201 and 201 which are formed in the separators 200 and 200 in a compressed state, whereby the base material integrated type seal 100 achieves a seal function against the fuel gas, the oxidization gas or the cooling water.

The bases 102a and 102a of the gaskets 102 and 102 have protruding portions 102c and 102c which protrude in their width direction. The protruding portions 102c and 102c are connected to each other via a filling layer 103 infilling a through hole 101a which is provided in the base material 101. In other words, the gaskets 102 and 102 are connected to each other via the filling layer 103. The protruding portions 102c and 102c may be formed over a whole length of the base 102a.

FIGS. 7 and 8 show a metal mold 300 for manufacturing the base material integrated type seal 100 by integrally forming the gaskets 102 and 102 in the base material 101. More specifically, the base material integrated type seal 100 is obtained by setting the base material 101 within the metal mold 300 which is constructed by an upper mold 301 and a lower mold 302 so as to mold clamp, and filling a liquid-like rubber for molding from an injection gate 304 provided in the upper mold 301 into cavities 303 and 303 which are defined by the base material 101 and inner surfaces of the upper mold 301 and the lower mold 302 so as to bridge and cure.

The through hole 101a for shaping the molding liquid-like rubber injected from the injection gate 304 into the cavities 303 and 303 in both sides of the base material 101 is necessarily provided at a position which is deviated from the seal lips 102b and 102b while taking "sink" on the basis of a bridging and curing into consideration. As a result, the cavities 303 and 303 corresponding to the molding space have expansion portions 303a and 303a which form the protruding portion 102c of the base 102a in the gasket 102, and the injection gate 304 and the through hole 101a of the base material 101 are provided at positions which correspond to the expansion portions 303a and 303a (refer to Japanese Unexamined Patent Publication No. 2011-96545).

SUMMARY OF THE INVENTION

Problem to be Solved by the Invention

However, since the conventional base material integrated type seal 100 has the protruding portions 102c and 102c protruding in their width direction in the bases 102a and 102a of the gaskets 102 and 102, it is unavoidable to make the widths of the seal grooves 201 and 201 formed in the separators 200 and 200 for accommodating the gaskets 102 and 102 wider at the degree of the protruding portions 102c and 102c. As a result, there has been a problem that a power generation area surrounded by the seal grooves 201 and 201 becomes relatively smaller.

The present invention is made by taking the above points into consideration, and a technical problem of the present invention is to achieve a space saving by making a width of a gasket as small as possible in a base material integrated type seal in which the gasket is integrally formed in a film, a sheet or a plate-like base material.

Means for Solving the Problem

As a means for effectively solving the technical problem mentioned above, a base material integrated type seal according to the invention of a first aspect has a film, a sheet or a plate-like base material, a gasket which is made of a rubber-like elastic material integrally provided in the base material, and a filling layer which is made of a rubber-like elastic material filled into a through hole provided in the base material, wherein the filling layer is structured such that a part of the filling layer is connected to the gasket and the other part protrudes out of the gasket while being approximately flush with the base material. The rubber-like elastic material is a rubber material or a synthetic resin material having a rubber-like elasticity.

According to the structure of the first aspect, the gasket made of the rubber-like elastic material integrally provided in the base material is structured such as to be connected to the filling layer which is made of the rubber-like elastic material filled in the through hole provided in the base material. Further, the filling layer protrudes out of the gasket, however, is formed within the through hole provided in the base material so as to be approximately flush with the base material, that is, formed at a thickness which is approximately equal to the base material. As a result, a size in the width direction of the gasket is substantially small. Accordingly, the seal groove for accommodating the gasket in an installed state to the device is not necessarily set to be a width which can accommodate the filling layer. Therefore, it is possible to make the width of the seal groove small.

A base material integrated type seal according to the invention of a second aspect is the structure described in the first aspect, wherein the gasket is provided in both sides in a thickness direction of the base material.

According to the structure of the second aspect, the gaskets made of the rubber-like elastic material in both sides in the thickness direction of the base material are structured such as to be connected to each other via the filling layer which is made of the rubber-like elastic material filled in the through hole provided in the base material.

A metal mold for manufacturing a base material integrated type seal according to the invention of a third aspect is a metal mold for obtaining the base material integrated type seal described in the first or second aspect by integrally forming the gasket made of the rubber-like elastic material in the film, the sheet or the plate-like base material, wherein the metal mold is constructed by a plurality of split molds, an injection gate is open between a plurality of split molds at a position which is spaced from the cavity, the injection gate injecting a liquid-like rubber for molding into a cavity which is defined between the base material and inner surfaces of the split molds in a state in which the base material is positioned and set between the split molds so as to be mold clamped, and the base material is positioned in such a manner that the through hole provided in the base material is communicated with both of the cavity and the injection gate.

According to the structure of the third aspect, in the case that the film, the sheet or the plate-like base material is positioned and set between a plurality of split molds so as to be mold clamped, the through hole provided in the base material is communicated with both of the cavity which is defined between the base material and the inner surface of the split molds by the mold clamping, and the injection gate which is open between a plurality of split molds at the position which is spaced from the cavity. Therefore, in the case that the liquid-like rubber for molding is injected from the injection gate, the liquid-like rubber for molding is filled into the cavity via the through hole and is shaped. Further, the bridged and cured portion of the liquid-like rubber for molding within the cavity forms the gasket which is made of the rubber-like elastic material integrally formed with the base material, and the bridged and cured portion of the liquid-like rubber for molding within the through hole forms the filling layer structured such that a part is connected to the gasket and the other part protrudes out of the gasket while being approximately flush with the base material.

Effect of the Invention

On the basis of the base material integrated type seal according to the present invention, it is possible to make the width of the gasket substantially small. As a result, it is possible to achieve a space saving.

On the basis of the metal mold for manufacturing the base material integrated type seal according to the present invention, it is possible to obtain the base material integrated type seal which achieves the space saving by making the width of the gasket substantially smaller.

DETAILED DESCRIPTION OF PREFERRED EMBODIMENTS

A description will be given below of preferred embodiments of a base material integrated type seal and a metal mold for manufacturing the base material integrated type seal according to the present invention with reference to the accompanying drawings.

Figure 1:
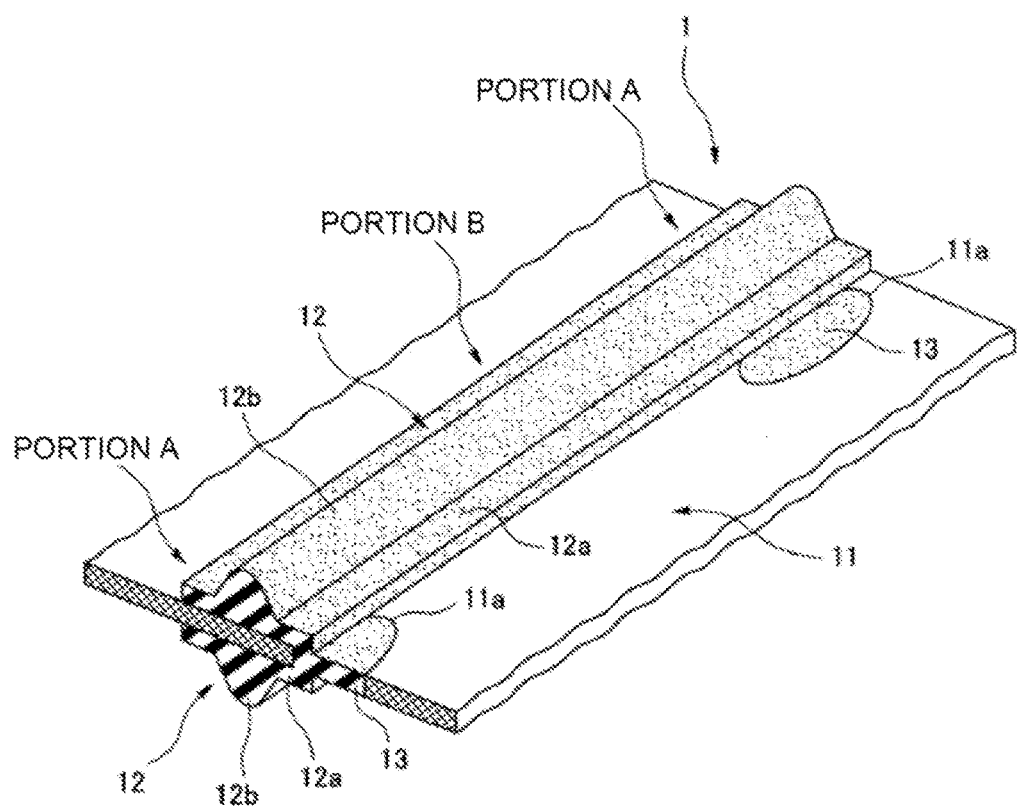
FIG. 1 is a perspective view of a substantial part cross section and shows a seal for a fuel battery as an embodiment of a base material integrated type seal according to the present invention.
Figure 2:
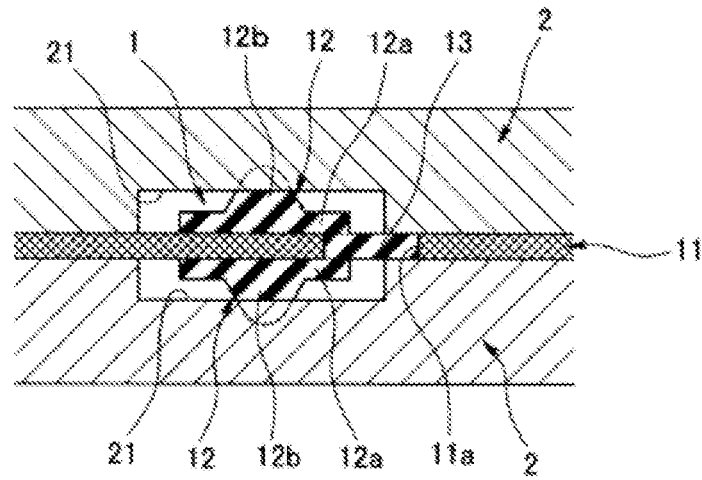
FIG. 2 is a cross sectional view of a substantial part and shows the seal for the fuel battery as the embodiment of the base material integrated type seal according to the present invention by cutting in a portion A in FIG. 1 together with a part of the fuel battery.
Figure 3:
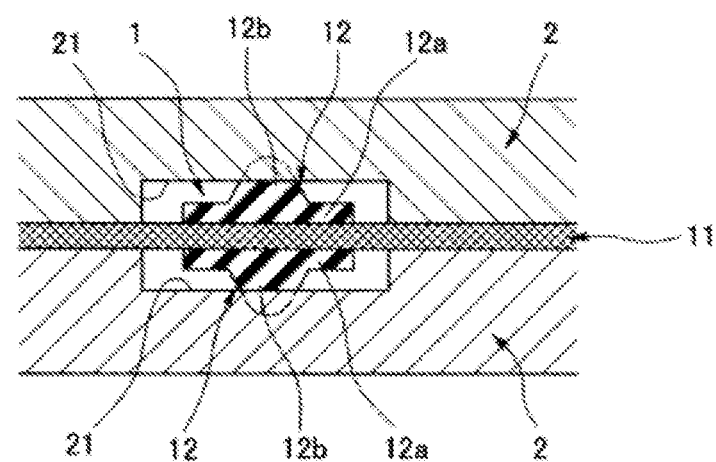
FIG. 3 is a cross sectional view of a substantial part and shows the seal for the fuel battery as the embodiment of the base material integrated type seal according to the present invention by cutting in a portion B in FIG. 1 together with a part of the fuel battery.

First of all, FIGS. 1 to 3 show a preferable embodiment in which a base material integrated type seal according to the present invention is applied as a seal for a fuel battery.

The base material integrated type seal 1 is structured, as shown in FIG. 1, such that gaskets 12 and 12 made of a rubber-like elastic material are integrally formed in both surfaces in a thickness direction of a base material 11 which is constructed by an MEA or a synthetic resin film (a synthetic resin plate) arranged in such a manner as to surround an outer periphery of the MEA. Each of the gaskets 12 is constructed by a flat base 12a which is bonded to a surface of the base material 11, and a seal lip 12b which is formed so as to protrude like a chevron from the base 12a. Further, the base material integrated type seal 1 is interposed between outer peripheral portions of separators 2 and 2 in a fuel battery cell, and the seal lips 12b and 12b in the gaskets 12 and 12 are brought into close contact with bottom surfaces of seal grooves 21 and 21 formed in the separators 2 and 2 in a compressed state, as shown in FIGS. 2 and 3, whereby the base material integrated type seal 1 achieves a seal function against fuel gas, oxidizing gas or cooling water.

A plurality of through holes 11a are provided in the base material 11 at positions which are deviated in a width direction from the seal lip 12b of the gasket 12 at an appropriate distance along an extending direction of the gasket 12, a filling layer 13 constructed by a rubber-like elastic material is filled within the through hole 11a, and the filling layer 13 is structured such that a part is connected to the bases 12a and 12a in the gaskets 12 and 12 and the other part protrudes out of the gaskets 12 and 12 so as to be approximately flush with the base material 11, that is, at an approximately equal thickness to the base material 11.

Therefore, the gaskets 12 and 12 in both sides of the base material 11 are connected to each other via the filling layer 13 which is protruded and formed so as to be approximately flush with the base material 11 at the appropriate distance from the bases 12a and 12a, that is, at the approximately equal thickness to the base material 11.

Figure 4:
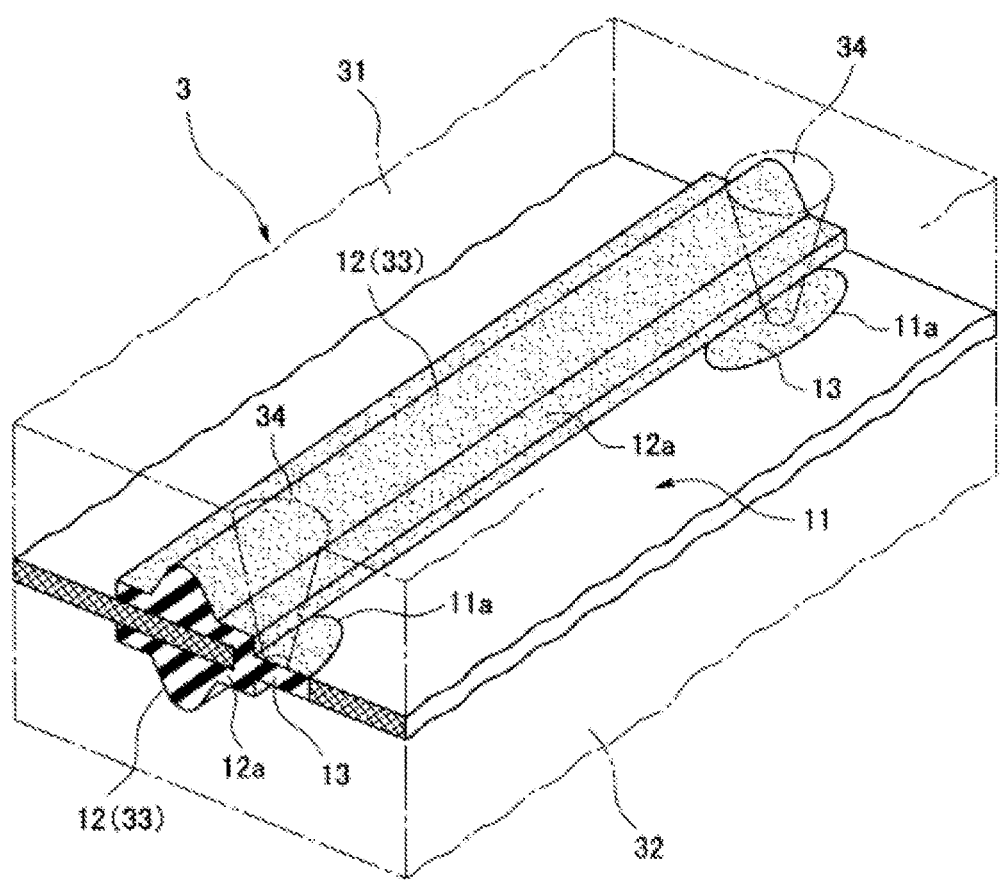
FIG. 4 is a perspective view of a substantial part cross section and shows a metal mold for manufacturing the seal for the fuel battery as the embodiment of the base material integrated type seal according to the present invention together with the manufactured fuel battery.
Figure 5:
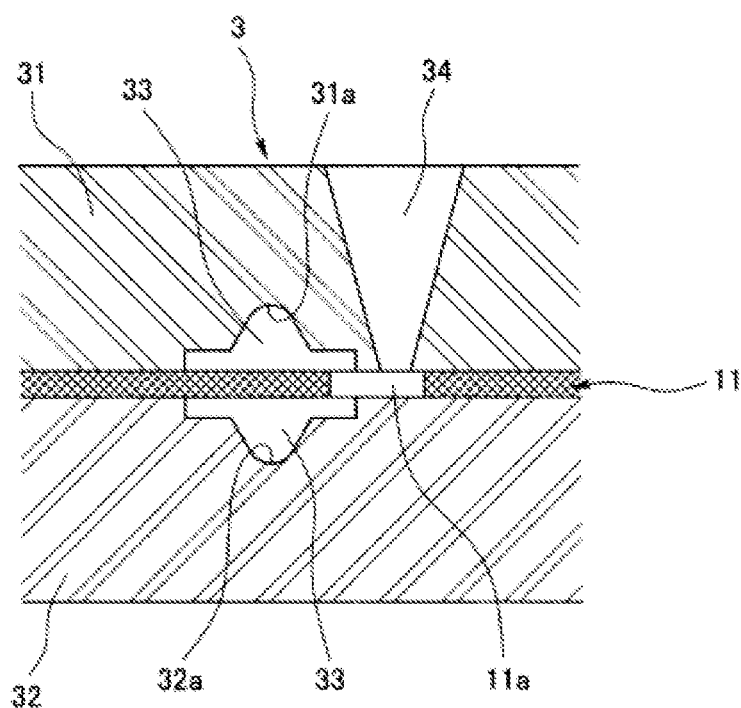
FIG. 5 is a cross sectional view of a substantial part and shows the metal mold for manufacturing the seal for the fuel battery as the embodiment of the base material integrated type seal according to the present invention together with the positioned and set base material.
Figure 6:
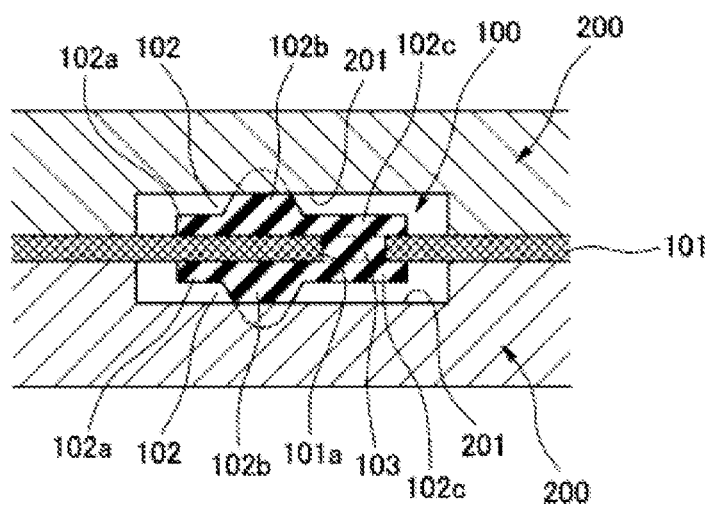
FIG. 6 is a partly cross sectional view showing a conventional seal for a fuel battery together with a part of the fuel battery.
Figure 7:
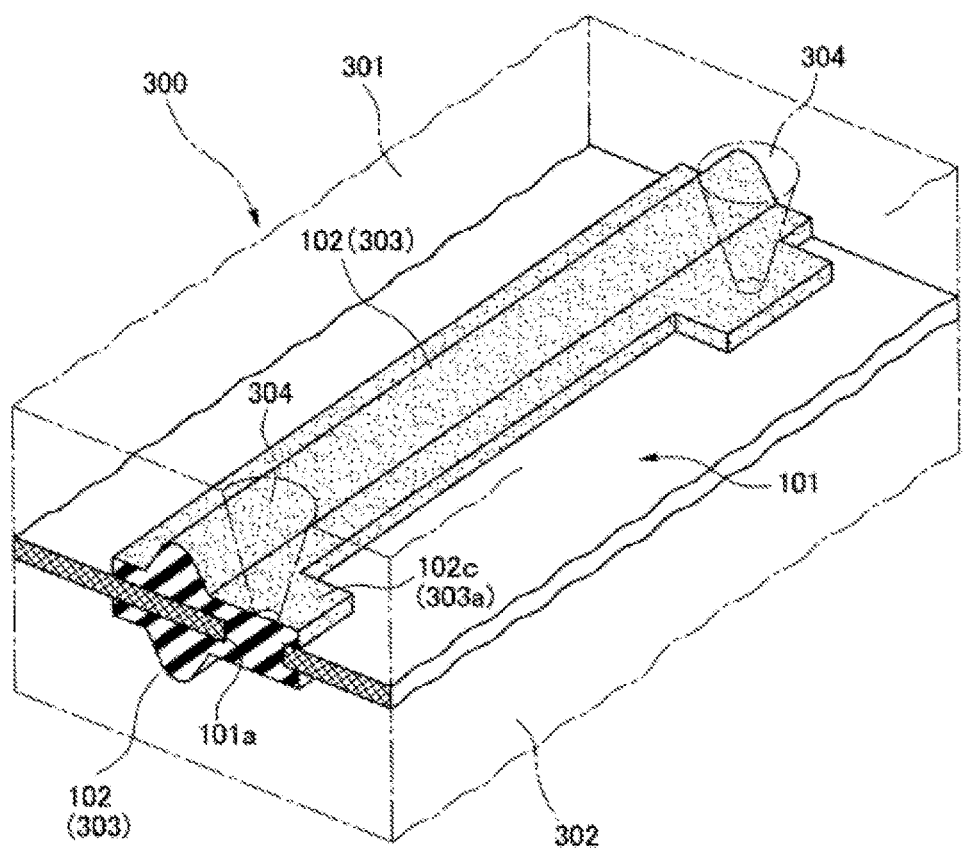
FIG. 7 is a perspective view of a substantial part cross section and shows a metal mold for manufacturing the conventional seal for the fuel battery together with the manufactured seal for the fuel battery.
Figure 8:
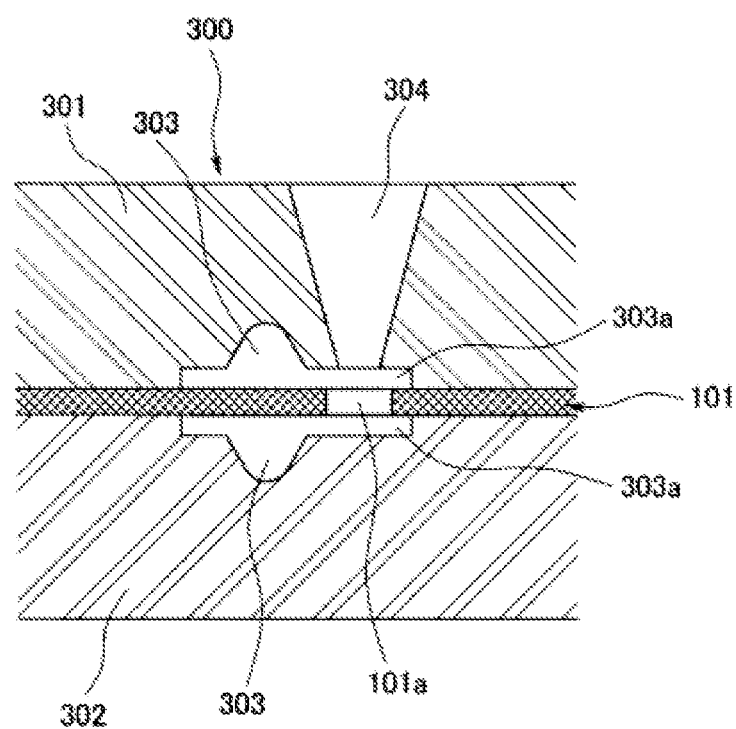
FIG. 8 is a partly cross sectional view showing the metal mold for manufacturing the conventional seal for the fuel battery together with the positioned and set base material.

FIGS. 4 and 5 shows a preferable embodiment of a metal mold according to the present invention for manufacturing the base material integrated type seal 1 shown in FIG. 1 by integrally forming the baskets 12 and 12 in the base material 11. The metal mold 3 according to the embodiment is constructed by an upper mold 31 and a lower mold 32, and groove-like concave portions 31a and 32a are formed in inner surfaces of the upper mold 31 and the lower mold 32, the groove-like concave portions 31a and 32a forming cavities 33 and 33 for forming the gaskets 12 and 12 shown in FIG. 1 between both surfaces of the base material 11 positioned and set therebetween. The upper mold 31 and the lower mold 32 correspond to the split mold described in the third aspect.

A plurality of injection gates 34 for injecting a liquid-like rubber for molding to the cavities 33 and 33 are provided in the upper mold 31, and the injection gate 34 is open between the upper mold 31 and the lower mold 32 at a position which is spaced from the groove-like concave portions 31a and 32a (the cavities 33 and 33).

On the other hand, a plurality of through holes 11a are previously provided in the base material 11 at appropriate distances along an extending direction of the cavities 33 and 33. Further, the providing position of the through hole 11a is set in such a manner that a part of the through hole is positioned between the cavities 33 and 33 and the other part protrudes in the width direction from between the cavities 33 and 33 in a state in which the base material 11 is positioned and set between the upper mold 31 and the lower mold 32.

Further, the providing position of the injection gate 34 provided in the upper mold 31 is set in such a manner as to be open toward each of the through holes 11a of the base material 11 in the case that the base material 11 is positioned and set between the upper mold 31 and the lower mold 32.

Therefore, in order to manufacture the base material integrated type seal 1 shown in FIG. 1 by using the metal mold 3 having the structure mentioned above, the base material 11 is first of all positioned and set between the upper mold 31 and the lower mold 32 so as to be mold clamped. At this time, the injection gate 34 provided in the upper mold 31 is open toward the through hole 11a provided in the base material 11, and a part of the through hole 11a is positioned between the cavities 33 and 33 which are defined between the base material 11 and the groove-like concave portions 31a and 32a of the upper mold 31 and the lower mold 32 by mold clamping. As a result, the through hole 11a is communicated with both of the cavities 33 and 33 and the injection gate 34.

Therefore, in the mold clamping state mentioned above, the molding liquid-like rubber injected from the injection gate 34 of the upper mold 31 is filled within the cavities 33 and 33 in both sides of the base material 11 via the through hole 11a of the base material 11 and is shaped. Further, the portion that the liquid-like rubber for molding is bridged and cured within the cavities 33 and 33 is formed as the gaskets 12 and 12 which is made of the rubber-like elastic material, and is integrated with the base material 11, and the portion that the liquid-like rubber for molding is bridged and cured within the through hole 11a is connected in its part to the gaskets 12 and 12 and is approximately flush with the base material 11 in its other part so as to be formed as the filling layer 13 which protrudes out of the gaskets 12 and 12, so that the base material integrated type seal 1 shown in FIG. 1 is obtained.

At this time, since the injection gate 34 is at the position which is deviated from the cavities 33 and 33 and is open toward the through hole 11a, it is possible to suppress an adverse effect caused by "sink" applied to the main body portion of the gaskets 12 and 12 which are formed within the cavities 33 and 33.

The base material integrated type seal 1 in FIG. 1 which is manufactured as mentioned above is formed within the through hole 11a which is provided in the base material 11 so as to be approximately flush with the base material 11, that is, at approximately the same thickness as the base material 11 although the filling layer 13 connecting the gaskets 12 and 12 in both sides of the base material 11 to each other protrudes out of the gaskets 12 and 12. As a result, the size in the width direction of the gaskets 12 and 12 (the bases 12a and 12a) is substantially small. Therefore, as shown in FIG. 2, the seal grooves 21 and 21 of the separators 2 and 2 are not necessarily formed with the width which can accommodate a whole from the gaskets 12 and 12 to the filling layer 13, so that it is possible to make the width of the seal grooves 21 and 21 small.

Therefore, an occupied area of the seal grooves 21 and 21 in the fuel battery cell is reduced. As a result, the power generating area (not shown) formed in the inner peripheral side of the seal grooves 21 and 21 does not become relatively small, and it is possible to achieve a space saving.

In the embodiment mentioned above, the description is given on the assumption that the base material 11 is the synthetic resin film (the synthetic resin plate) which is arranged so as to surround the MEA in the fuel battery cell or the outer periphery of the MEA, however, the present invention can be applied to the case that the base material 11 is the separator, the other films, the sheet or the plate-like member.

Further, in the embodiment mentioned above, the description is given on the assumption that the basket 12 is provided on both surfaces in the thickness direction of the base material 11, however, the present invention can be applied to the case that the gasket 12 is provided on one surface of the base material 11.

What is claimed is:

1. A base material integrated type seal comprising:
   a plate base material, which has an upper major surface and a lower major surface that are parallel and provide the plate base material with a constant thickness along an entire length thereof;
   a gasket including a base and a sealing lip, which are made of elastomeric material integrally provided in the plate base material such that the upper and lower major surfaces of the plate base material are positioned on opposing sides of the gasket along an entire length of the gasket; and
   a filling layer which is made of elastomeric material filled into a through hole provided in the plate base material,
   wherein the filling layer is structured such that a part of the filling layer is connected to the gasket and the other part protrudes out of the gasket approximately at the same thickness as the plate base material,
   a portion of the base overlaps the through hole, the filling layer is attached to the base in the through hole, and the filling layer has a thickness equal to that of the plate base material and less than the base of the gasket, and
   wherein the sealing lip extends outward from the gasket in a first direction, a portion of the plate base material is embedded in the gasket and extends in a second direction orthogonal to the first direction such that a terminal end thereof is arranged orthogonal to a terminal end of the sealing lip, and the portion of the plate base material embedded in the gasket is positioned in the gasket at a location where a thickness of the gasket is greater than the thickness of the plate base material.

* * * * *